(12) United States Patent
Ma

(10) Patent No.: US 12,433,929 B1
(45) Date of Patent: Oct. 7, 2025

(54) DIETARY SUPPLEMENT FOR PERSONS INFECTED WITH A RESPIRATORY VIRUS

(71) Applicant: SVA Holding Co. LLC, Wilmington, DE (US)

(72) Inventor: Ning Ma, Hicksville, NY (US)

(73) Assignee: SVA Holding Co LLC, Wilmington, DE (US)

( * ) Notice: Subject to any disclaimer, the term of this patent is extended or adjusted under 35 U.S.C. 154(b) by 1161 days.

(21) Appl. No.: 16/876,044

(22) Filed: May 16, 2020

(51) Int. Cl.
| | | |
|---|---|---|
| *A61K 36/539* | (2006.01) | |
| *A23L 33/105* | (2016.01) | |
| *A61K 9/00* | (2006.01) | |
| *A61K 36/232* | (2006.01) | |
| *A61K 36/284* | (2006.01) | |
| *A61K 36/355* | (2006.01) | |
| *A61K 36/428* | (2006.01) | |
| *A61K 36/481* | (2006.01) | |
| *A61K 36/484* | (2006.01) | |
| *A61K 36/532* | (2006.01) | |
| *A61K 36/575* | (2006.01) | |
| *A61K 36/65* | (2006.01) | |
| *A61K 36/704* | (2006.01) | |
| *A61K 36/736* | (2006.01) | |
| *A61K 36/8964* | (2006.01) | |
| *A61K 36/906* | (2006.01) | |

(52) U.S. Cl.
CPC .......... *A61K 36/539* (2013.01); *A23L 33/105* (2016.08); *A61K 36/232* (2013.01); *A61K 36/284* (2013.01); *A61K 36/355* (2013.01); *A61K 36/428* (2013.01); *A61K 36/481* (2013.01); *A61K 36/484* (2013.01); *A61K 36/532* (2013.01); *A61K 36/575* (2013.01); *A61K 36/65* (2013.01); *A61K 36/704* (2013.01); *A61K 36/736* (2013.01); *A61K 36/8964* (2013.01); *A61K 36/906* (2013.01); *A61K 9/0056* (2013.01); *A61K 9/0095* (2013.01)

(58) Field of Classification Search
CPC .. A61K 36/539; A61K 36/232; A61K 36/284; A61K 36/355; A61K 36/428; A61K 36/481; A61K 36/484; A61K 36/532; A61K 36/575; A61K 36/65; A61K 36/704; A61K 36/736; A61K 36/8964; A61K 36/906; A61K 9/0056; A61K 9/0095; A23L 33/105
See application file for complete search history.

(56) References Cited

PUBLICATIONS

Da Yuan Yin (Reach the Membrane Source Decoction), May 8, 2021 (archived online Sep. 6, 2015), 4 pages.

*Primary Examiner* — Aaron J Kosar

(57) ABSTRACT

A dietary supplement comprises the ingredients: *Fructus tsaoko* (Tsaoko Fruit), *Rhizoma polygoni cuspidati* (Knotweed), *Radix scutellariae* (Skullcap), *Rhizoma anemarrhenae* (Know Mother Root), *Cortex magnoliae officinalis* (Magnolia Bark), *Radix paeoniae alba* (White Peony Root), *Rhizoma atractylodis* (Red Atractylodis), *Herba agastaches/ Pogostemonis* (Patchouli), *Semen armeniacae* (Apricot Kernel), *Fructus trichosanthis* (Chinese Cucumber), *Radix astragali* (Mongolian Milk-Vetch), *Radix angelicae sinensis* (Female Ginseng), *Flos lonicerae* (Honeysuckle), and *Radix glycyrrhizae* (Licorice). These ingredients are dried and integrated into a tea, which is consumed by a person infected or possibly infected with a respiratory virus.

10 Claims, 1 Drawing Sheet

| 草果 | Cao Guo | Tsaoko Fruit or Cochin Cardamom Fruit | *Fructus Tsaoko* | 10 g | 8.33 % |
|---|---|---|---|---|---|
| 虎杖 | Hu Zhang | Knotweed | *Rhizoma Polygoni Cuspidati* | 10 g | 8.33 % |
| 黄芩 | Hung Qin | Scute, Baical Skullcap Root, or Scutellaria | *Radix Scutellariae* | 8 g | 6.67 % |
| 知母 | Zhi Mu | Anemarrhena Rhizome and Know Mother Root | *Rhizoma Anemarrhenae* | 8 g | 6.67 % |
| 厚朴 | Hou Po | Magnolia Bark | *Cortex Magnoliae Officinalis* | 8 g | 6.67 % |
| 白芍 | Bai Shao | White Peony Root | *Radix Paeoniae Alba* | 8 g | 6.67 % |
| 苍术 | Cang Zhu | Red Atractylodis | *Rhizoma Atractylodis* | 8 g | 6.67 % |
| 藿香 | Hou Xiang | Patchouli or Korean Mint | *Herba Agastaches / Pogostemonis* | 6 g | 5.00 % |
| 杏仁 | Xing Ren | Apricot Kernel or Seed | *Semen Armeniacae* | 8 g | 6.67 % |
| 瓜蒌 | Gua Lou | Chinese Cucumber | *Fructus Trichosanthis* | 10 g | 8.33 % |
| 黄芪 | Huang Qi | Astragalus Root or Mongolian Milk-Vetch | *Radix Astragali* | 12 g | 10.00 % |
| 当归 | Dang Gui | Female Ginseng | *Radix Angelicae Sinensis* | 8 g | 6.67 % |
| 金银花 | Jin Yin Hua | Honeysuckle | *Flos Lonicerae* | 10 g | 8.33 % |
| 甘草 | Gan Cao | Licorice | *Radix Glycyrrhizae* | 6 g | 5.00 % |
| | | | Total | 120 g | 100.00 % |

DIETARY SUPPLEMENT FOR PERSONS INFECTED WITH A RESPIRATORY VIRUS

BACKGROUND OF THE INVENTION

1. Field of Invention

The present invention relates to dietary supplements, particularly those for persons infected with a respiratory virus.

2. Description of Related Art

Coronaviruses are a group of related ribonucleic acid ("RNA") viruses that cause diseases in mammals. In humans, these viruses cause respiratory tract infections that can range from mild to lethal. Mild illnesses include some cases of the common cold (which is caused also by certain other viruses, predominantly rhinoviruses), while more lethal varieties can cause severe acute respiratory syndrome ("SARS"), Middle East respiratory syndrome ("MERS"), and Coronavirus Disease 2019 ("COVID-19").

With global pandemic of the ubiquitously known COVID-19, anything providing relief of the symptoms associated therewith is in high demand. COVID-19 is an infectious disease caused by severe acute respiratory syndrome coronavirus 2 (SARS-CoV-2). Common symptoms include fever, cough, fatigue, shortness of breath, and loss of smell and taste. While the majority of cases result in mild symptoms, some progress to viral pneumonia, multi-organ failure, or cytokine storm. The time from exposure to onset of symptoms is typically around five days but may range from two to fourteen days. In just a few months from patient zero, global confirmed cases totaled around 4 million. Some projections put the total amount of future cases at many millions more. Additionally, some experts anticipate that COVID-19 may return seasonally.

Antiviral medications are being investigated for COVID-19, as well as medications targeting the immune response. None have yet been shown to be clearly effective on mortality. However, remdesivir may have an effect on the time it takes to recover from the virus. Emergency use authorization for remdesivir was granted in the United States on May 1, 2020, for people hospitalized with severe COVID-19 symptoms. The interim authorization was granted considering the lack of other specific treatments being available, and that its potential benefits appear to outweigh the potential risks. Taking over-the-counter cold medications, drinking fluids, and resting may help alleviate symptoms. Depending on the severity, oxygen therapy, intravenous fluids, and breathing support may be required. The use of steroids may worsen outcomes. However, these solutions appear to only have a nominal effect on the symptoms.

SUMMARY OF THE INVENTION

The present invention provides a dietary supplement for persons infected with a respiratory virus such as SARS-CoV-2, the virus that causes COVID-19. In an embodiment of the invention, a dietary supplement comprises the ingredients: *Fructus tsaoko* (Tsaoko Fruit), *Rhizoma polygoni cuspidati* (Knotweed), *Radix scutellariae* (Skullcap), *Rhizoma anemarrhenae* (Know Mother Root), *Cortex magnoliae officinalis* (Magnolia Bark), *Radix paeoniae alba* (White Peony Root), *Rhizoma atractylodis* (Red Atractylodis), *Herba agastaches/Pogostemonis* (Patchouli), *Semen armeniacae* (Apricot Kernel), *Fructus trichosanthis* (Chinese Cucumber), *Radix astragali* (Mongolian Milk-Vetch), *Radix angelicae sinensis* (Female Ginseng), *Flos lonicerae* (Honeysuckle), and *Radix glycyrrhizae* (Licorice). These ingredients are dried and integrated into a tea, which is consumed by a person infected or possibly infected with a respiratory virus.

In a preferred embodiment of the invention, 10 grams of *Fructus tsaoko*, 10 grams of *Rhizoma polygoni cuspidati*, 8 g of *Radix scutellariae*, 8 grams of *Rhizoma anemarrhenae*, 8 grams of *Cortex magnoliae officinalis*, 8 g of *Radix paeoniae alba*, 8 grams of *Rhizoma atractylodis*, 6 grams of *Herba agastaches/Pogostemonis*, 8 grams of *Semen armeniacae*, 10 grams of *Fructus trichosanthis*, 12 grams of *Radix astragali*, 8 grams of *Radix angelicae sinensis*, 10 grams of *Flos lonicerae*, and 6 grams of *Radix glycyrrhizae* are mixed together (in their concentrated dried forms) to create 120 grams of a dietary supplement. Four grams of the dietary supplement are dissolved into hot water and drank as a tea, preferably three times/day, after meal.

In a less preferred embodiment of the invention, the amounts of the above-noted ingredients can each be varied twenty-five percent by weight. For example, *Fructus tsaoko* may range from 7.5 to 12.5 grams.

The advantages of the invention include a safe and easily digestible dietary supplement made from natural substances, which can be stored for at least six months if kept in a dry place. The dietary supplement may be useful for persons infected with a respiratory virus such as SARS-CoV-2 and/or persons suffering a runny nose, fever, chills, sore throat, headache, and loss of smell or taste. All of the dietary supplement's ingredients are approved by the U.S. Food and Drug Administration (FDA).

The foregoing, and other features and advantages of the invention, will be apparent from the following, more particular description of the preferred embodiments of the invention, and the accompanying FIGURE.

BRIEF DESCRIPTION OF THE DRAWINGS

For a more complete understanding of the present invention, the objects and advantages thereof, reference is now made to the ensuing descriptions taken in connection with the accompanying drawing briefly described as follows:

FIG. 1 illustrates a dietary supplement composition according to an embodiment of the invention.

DETAILED DESCRIPTION OF THE EMBODIMENTS

Preferred embodiments of the present invention and their advantages may be understood by referring to FIG. 1. Further features and advantages of the invention, as well as the ingredients, manufacture, and administration of various embodiments of the invention, are described in detail below. Although the invention is described in the context of a tea, any form may be implemented for ingestion such as, but not limited to a powder food or drink additive, a pill, or a liquid, or other form suitable for various administrations of a dietary supplement, the identification and implementation of which is apparent to one of ordinary skill in the art.

The present invention is a novel dietary supplement formulated from fourteen (14) FDA approved herbal ingredients. Although each ingredient is known in traditional Chinese medicine, Applicant has found that the combination of the ingredients, particularly in the weight percentages specified herein, provides a synergistic and unexpected health benefit greater than the sum of the individual ingredients, and is useful for people infected with a respiratory virus such as SARS-CoV-2, which causes COVID-19. People infected with SARS-CoV-2 who have taken the dietary supplement as instructed herein attest to an improvement in overall health.

FIG. 1 illustrates a table of ingredients for a dietary supplement according to an embodiment of the invention. The table of ingredients specifies each ingredient by its Chinese name (with simple Chinese characters), common English name, pharmaceutical Latin name, and amount by (1) weight percentage or (2) weight to create 120 grams of the dietary supplement. Particularly, the dietary supplement comprises Cao Guo (Tsaoko Fruit or Cochin Cardamom Fruit; *Fructus tsaoko*), Hu Zhang (Bushy Knotweed Rhizome, Giant Knotweed, Japanese Knotweed Root, and Polygoni Cuspidatum; *Rhizoma polygoni cuspidati*), Hung Qin (Scute, Baical Skullcap Root, and Scutellaria; *Radix scutellariae*), Zhi Mu (Anemarrhena Rhizome and Know Mother Root; *Rhizoma anemarrhenae*), Hou Po (Magnolia Bark; *Cortex magnoliae officinalis*), Bai Shao (White Peony Root and Peony; *Radix paeoniae alba*), Cang Zhu (Black Atractylodis Rhizome, Atractylodis Lancea, Gray Atractylodis, Red Atractylodis, and Sword-like Atractylodis Rhizome; *Rhizoma atractylodis*), Hou Xiang (Patchouli, Agastache, Pogostemonis, Rugose Giant Hyssop Herb, Hyssop, and Wrinkled Giant Hyssop; *Herba agastaches/Pogostemonis*), Xing Ren (Apricot Kernel, Apricot Seed, and Bitter Apricot Kernel; *Semen armeniacae*), Gua Lou (Trichosanthes Fruit and Snakegourd Fruit; *Fructus trichosanthis*), Huang Qi (Astragalus Root and Milk-Vetch Root; *Radix astragali*), Dang Gui (Chinese Angelica Root, Tang-Kuei, and Dong Quai Root; *Radix angelicae sinensis*), Jin Yin Hua (Honeysuckle Flower, Lonicera, and Woodbine; *Flos lonicerae*), and Gan Cao (Licorice Root, Baked Licorice Root, and Ural Licorice Root; *Radix glycyrrhizae*).

Cao Guo is known as Tsaoko Fruit or Cochin Cardamom Fruit (pharmaceutical Latin: *Fructus tsaoko*). Cao Guo comes from a perennial herb related to the ginger family. The plant thrives in the world's rain forests and tropical regions, with brightly colored flowers, long leaves and slender stems. In China, Cao Guo is produced mainly in the Yunna, Guangxi, and Guizhou provinces. The fruit is gathered in the autumn when ripe, cleaned, then dried in the sun. Once dried, the outer shell of the fruit is removed, as are the fruit's seeds. Cao Guo contains an essential oil comprised of numerous chemicals, including cineole, geraniol, and camphor. The essential oil has been shown to exhibit antibacterial and antifungal properties in a laboratory setting. Cao Guo is considered acrid and warm, and is affiliated with the Spleen and Stomach meridians. It is often used by itself to treat common digestive disorders, ranging from stomach pain and flatulence to excessive belching, indigestion, and nausea. Small amounts of Cao Guo will promote urination. In addition, it can treat some types of malaria, often in conjunction with betel nuts, anemarrhena, and dichroa root. In a preferred embodiment of the invention, the dietary supplement comprises 8.33 weight-percent (wt %) Cao Guo.

Hu Zhang is known as Bushy Knotweed Rhizome, Giant Knotweed, Japanese Knotweed Root, and Polygoni Cuspidatum (pharmaceutical Latin: *Rhizoma polygoni cuspidati*). Hu Zhang is used by itself to treat atherosclerosis (hardening of the arteries), heart disease, and high cholesterol, as well as constipation, hepatitis, and gallstones. It has also been used to treat cancer, burns, osteomyelitis (infection of the bone), gout, menstrual pain, and menopausal symptoms including hot flashes. In traditional Chinese medicine, formulations containing Hu Zhang are prescribed for treating cough, hepatitis, jaundice, amenorrhea, vaginal discharge, joint pain, burns, and snake bites. In a preferred embodiment of the invention, a dietary supplement comprises 8.33 wt % Hu Zhang.

Huang Qin is known as Scute, Baical Skullcap Root, and Scutellaria (pharmaceutical Latin: *Radix scutellariae*). Huang Qin is a conical, twisting type of herb that can reach up to a foot in length, with long brown roots. The roots are harvested in autumn or spring, after a plant reaches between three and four years of age, and are used in herbal preparations. According to the principles of traditional Chinese medicine, Huang Qin is associated with the Large Intestine, Liver, Lung, and Stomach meridians, and has spicy, bitter, and cold properties. Its main functions are to remove heat and invigorate the blood. Huang Qin is used by itself for general trauma, sores, and abscesses on the skin, diarrhea, insect bites, and snake bites. Huang Qin also has anti-inflammatory properties, and is often used to reduce swelling caused by injury. It also lowers blood pressure, and is used by some practitioners as a form of sedative. In a preferred embodiment of the invention, a dietary supplement comprises 6.67 wt % Huang Qin.

Zhi Mu is known as Anemarrhena Rhizome and Know Mother Root (pharmaceutical Latin: *Rhizoma anemarrhenae*). Zhi Mu is a small, ornamental plant native to northern China. A member of the lily family, Zhi Mu is a decorative plant, with grass like leaves and branches and fragrant-smelling flowers that open at night. The root, or rhizome, is used medicinally, and is often dried for use in decoctions. Internally, it is used by itself for a variety of disorders, including congestive fever, high fever, chronic bronchitis, excessive sweating, dry throat, cough, dizziness, lumbago, and pneumonia. Externally, it is used as part of a mouth wash to treat oral ulcers. Extracts of the plant contain compounds called saponins—one of which, asphonin, can be used to effectively treat lower back pain. In traditional Chinese medicine, Zhi Mu purges heat, nurtures yin and relaxes tension. In a preferred embodiment of the invention, a dietary supplement comprises 6.67 wt % Zhi Mu.

Hou Po is known as Magnolia Bark (pharmaceutical Latin: *Cortex magnoliae officinalis*). Hou Po comes from the magnolia tree, a deciduous arbor that grows in the Sichuan, Hubei, and Zhejiang provinces of China. The tree is often used as a type of ornament for gardens, and is an important source of timber, with green leaves and fragrant flowers that vary in color from white to purple. The bark is harvested first by being peeled from the tree, then dried, boiled (until the internal surface of the bark turns a dark red or brownish gray), steamed until soft, and rolled into cylindrical pieces. At that point, the bark is again dried and prepared with ginger juice for later use. In traditional Chinese medicine, Hou Po has bitter, pungent, and warm properties, and is associated with the Liver, Lung, Spleen, and Stomach meridians. Traditionally, it has been used by itself to treat asthma, coughs, and abdominal problems. In a preferred embodiment of the invention, a dietary supplement comprises 6.67 wt % Hou Po.

Bai Shao is known as White Peony Root or simply, Peony (pharmaceutical Latin: *Radix paeoniae alba*). Bai Shao is one of several herbs that belong to the paeonia family. There are hundreds of varieties of peony. Peonies are a rather tall plant, with some varieties reaching a height of five feet (white peony usually grows no higher than three feet). A peony resembles a tall shrub, with branching stems that produce, glossy, deep green leaves, and flowers that grow at the end of the stems. Peony root is brownish in color and resembles a small, thin potato; the root is used. Bai Shao is used by itself to relax muscles, lower blood pressure, relieve cramps and spasms (especially menstrual cramps), and reduce pain. In a preferred embodiment of the invention, a dietary supplement comprises 6.67 wt % Bai Shao.

Cang Zhu is known as Red Atractylodis (pharmaceutical Latin: *Rhizoma atractylodis*). Cang Zhu is an aromatic herb found throughout Asia, especially China. The plant consists of a tall, thin wooden stem, with serrated leaves that have small, hair-like projections at the end. The rhizome is used medicinally. The main active ingredients of Cang Zhu are essential oils, which comprise approximately five percent of the dried rhizome. The principal constituent is beta-eudesmol; other components include hinesol, elemol, atractylodin, selinene, and furaldehyde. In traditional Chinese medicine, Cang Zhu is used for digestive system disorders and arthralgia. Cang Zhu is utilized to dry dampness of the spleen and stomach, expel wind-cold dampness, and strengthen the spleen. In a preferred embodiment of the invention, a dietary supplement comprises 6.67 wt % Cang Zhu.

Hou Xiang is known as Patchouli or Korean Mint (pharmaceutical Latin: *Herba agastaches/Pogostemonis*). Hou Xiang is a thin, medium-sized plant believed to have originated in Asia, in the region surrounding the Black Sea. It is now found throughout Asia, especially in arid regions, partly because of its ability to survive in harsh climates. Hou Xiang has a light odor, with small, needle-like leaves and fragrant purple flowers. Both the leaves and flowers are used in herbal preparations. Traditionally, Hou Xiang has been used to soothe sore throats and clear up congestion in the chest. In a preferred embodiment of the invention, a dietary supplement comprises 5.00 wt % Hou Xiang.

Xing Ren is known as Apricot Kernel, Apricot Seed, and Bitter Apricot Kernel (pharmaceutical Latin: *Semen armeniacae*). In traditional Chinese medicine, Xing Ren is considered to have bitter, warm, and slightly toxic properties, and affects the Large Intestine and Lung meridians. It is used to mitigate cough and wheezing, moistens the intestines, and unblocks bowels. Xing Ren contains a variety of amino acids and other substances, including oleic and linoleic acid. In a preferred embodiment of the invention, a dietary supplement comprises 6.67 wt % Xing Ren.

Gua Lou is known as Trichosanthes Fruit and Snakegourd Fruit (pharmaceutical Latin: *Fructus trichosanthis*). Gua Lou is a member of the gourd family. It is an annual vine, with angular, fuzzy stems and branched tendrils. It is covered with broadly angled or lobed leaves and white flowers. The plant's fruit resembles a cucumber, except for its length (which may reach from one to five feet) and may appear club-shaped or curved. Native to India, Gua Lou is becoming popular in the United States not only for its medicinal properties, but its interesting appearance. Different parts of the Gua Lou plant are used for different ailments. In traditional Chinese medicine concepts, trichosanthes seeds (gua lou ren) are used to treat dry stools and mild forms of constipation, and to help wounds heal. Trichosanthes root (tian hua fen) treats lung heat conditions that have phlegm and dryness, and reduces toxins manifested by sores and inflammation, especially breast abscesses. Both the seeds and root can be used externally or internally as needed. Trichosanthis peel treats the stomach and aids in the circulation of qi. Many Chinese herbalists also use Gua Lou for high blood pressure and high blood lipid levels. In a preferred embodiment of the invention, a dietary supplement comprises 8.33 wt % Gua Lou.

Huang Qi is known as Astragalus Root and Mongolian Milk-Vetch Root (pharmaceutical Latin: *Radix astragali*). Huang Qi is an herb native to northern China. Huang Qi contains numerous compounds, including flavonoids, polysaccharides, amino acids, and trace minerals. Traditionally, it was used in China for conditions such as night sweats, diarrhea, and qi deficiency. In a preferred embodiment of the invention, a dietary supplement comprises 10.00 wt % Huang Qi.

Dang Gui is known as Chinese Angelica Root, Tang-Kuei, and Dong Quai Root (pharmaceutical Latin: *Radix angelicae sinensis*). Like fennel, Dang Gui is a member of the celery family. A small, perennial herb found in Japan and the western regions of China, Dang Gui typically grows in ravines, riverbanks and coastal areas. Dang Gui is traditionally believed to have a balancing effect on the female hormonal system. Some studies show that Dang Gui dilates blood vessels, which can reduce blood pressure. It has also shown to improve oxygen utilization in the liver, and increases the metabolism of glutamic acid and cysteine. In a preferred embodiment of the invention, a dietary supplement comprises 6.67 wt % Dang Gui.

Jin Yin Hua is known as Honeysuckle Flower, *Lonicera*, and Woodbine (pharmaceutical Latin: *Flos lonicerae*). There are approximately 200 species of honeysuckle that grow worldwide, all of which belong to the genus *Lonicera*, of the family Caprifoliaceae. Although they are usually found in the temperate zones, honeysuckle has also been known to grow in the Himalayas and southern Asia. The Japanese honeysuckle (*Lonicera japonica*) is used in traditional Chinese medicine. It has fragrant, yellow-white flowers and black berries. Different parts of the honeysuckle are used to treat different conditions. The flower buds are gathered in the beginning of summer, then dried in the shade before being used in herbal remedies. They can be used raw, or after being fried or distilled. In traditional Chinese medicine, Jin Yin Hua has sweet and cold properties, and is associated with the Lung, Stomach, and Large Intestine meridians. It is used to clear heat and remove toxins. Generally, Jin Yin Hua has been employed to treat a variety of conditions, ranging from fevers, ulcers, inflammation, sore throats, and skin infections. In a preferred embodiment of the invention, a dietary supplement comprises 8.33 wt % Jin Yin Hua.

Gan Cao is known as Licorice Root, Baked Licorice Root, and Ural Licorice Root (pharmaceutical latin: *Radix glycyrrhizae* and *Radix glycyrrhizae preparata* (Zhi Gan Cao)). Licorice is a plant originally grown in central Europe, but now found all across Europe and Asia. Aside from its medicinal properties, it has been used to flavor foods for centuries. Licorice root is used medicinally. The two most important components of Gan Cao are glycyrrhizins and flavonoids. Glycyrrhizin works as an anti-inflammatory and antiviral and inhibits the breakdown of cortisol. Gan Cao flavonoids are powerful antioxidants; they work to protect liver cells and help digestive tract cells heal. Some studies have found that licorice flavonoids kill *Heliobacter pylori*, the bacteria responsible for most ulcers and stomach inflammation. In addition to its use as a flavoring, Gan Cao has traditionally been employed to sooth coughs and sore throats, coat the digestive and urinary tracts, and treat various conditions ranging from diabetes to tuberculosis. In a preferred embodiment of the invention, a dietary supplement comprises 5.00 wt % Gan Cao.

In a preferred embodiment of the invention, 10 grams of *Fructus tsaoko,* 10 grams of *Rhizoma polygoni cuspidati,* 8 g of *Radix scutellariae,* 8 grams of *Rhizoma anemarrhenae,* 8 grams of *Cortex magnoliae officinalis,* 8 g of *Radix paeoniae alba,* 8 grams of *Rhizoma atractylodis,* 6 grams of *Herba agastaches/Pogostemonis,* 8 grams of *Semen arme-* niacae, 10 grams of *Fructus trichosanthis*, 12 grams of *Radix astragali*, 8 grams of *Radix angelicae sinensis*, 10 grams of *Flos lonicerae*, and 6 grams of *Radix glycyrrhizae* are mixed together (in their concentrated dried forms) to create 120 grams of a dietary supplement. Four grams of the dietary supplement are dissolved into hot water and consumed as a tea, preferably three times/day, after meal. The individual ingredients may be in powder form. In such an embodiment, the individual ingredients may be combined using, for example, a tumbling blender and mixed until the dietary supplement reaches a homogenous mixture. Tumbling blenders include a v-blender or twin shell blender.

The present invention is specially designed for persons suffering symptoms from respiratory virus infections, such as fever, aversion to cold, running nose, cough, sore throat, headache, and loss of the sense of smell and taste. Phlegm should be more productive.

If a person's fever is not going down after one day, 4 grams of the dietary supplement can be combined with 30 grams of ginger, and 1 tablespoon of honey, which is boiled to form a tea.

Alternatively, the dietary supplement may be administered orally as a tablet, capsule, pill, gum, lozenge, candy, syrup, drops, dissolving sheets, dissolving powder, pastes, and gelatin-based consumables. The dietary supplement can be taken through means other than oral. For example, the dietary supplement can be integrated into eye drops, ear drops, nose drops, inhalers, topical creams, wipes, patches, sponges, diffusers, vapes, and aerosolized liquids. In other embodiments, the dietary supplements can be taken intravenously.

The composition works unexpectedly well and taking the composition throughout the day may provide a more robust effect on the recipient. The composition further works unexpectedly well in that by combining the ingredients as described herein, the ingredients have a synergistic effect that provides the recipient with greatly increased effects. The constituents of the composition form a synergistic compound where the combined effect is greater than the sum of their separate effects. For example, the dietary supplement composition may reduce the risk of symptoms such as fever, chills, runny nose, coughing, sore throat, headache, and the loss of smell and/or taste.

In addition to the exemplary ingredients described herein, other ingredients may be used to assist administration. In an example where the composition is integrated into a capsule or tablet, the composition may also include binding agents or other inactive ingredients.

To make the composition in an exemplary methodology, one takes the ingredients as described in the exemplary embodiments and mixes them in powder form until a homogeneous mixture is achieved. The composition is then packaged into capsules to be taken orally.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A homogenous, shelf-stable composition to be ingested for health benefits comprising the dried elements of: *Fructus tsaoko, Rhizoma polygoni cuspidati, Radix scutellariae, Rhizoma anemarrhenae, Cortex magnoliae officinalis, Radix paeoniae alba, Rhizoma atractylodis, Herba agastaches/Pogostemonis, Semen armeniacae, Fructus trichosanthis, Radix astragali, Radix angelicae sinensis, Flos lonicerae*, and *Radix glycyrrhizae*.

2. The composition of claim 1, wherein the *Fructus tsaoko* is between 6.25 wt % to 10.41 wt %, the *Rhizoma polygoni cuspidati* is between 6.25 wt % to 10.41 wt %, the *Radix scutellariae* is between 5.00 wt % to 8.34 wt %, the *Rhizoma anemarrhenae* is between 5.00 wt % to 8.34 wt %, the *Cortex magnoliae officinalis* is between 5.00 wt % to 8.34 wt %, the *Radix paeoniae alba* is between 5.00 wt % to 8.34 wt %, the *Rhizoma atractylodis* is between 5.00 wt % to 8.34 wt %, the *Herba agastaches/Pogostemonis* is between 3.75 wt % to 6.25 wt %, the *Semen armeniacae* is between 5.00 wt % to 8.34 wt %, the *Fructus trichosanthis* is between 6.25 wt % to 10.41 wt %, the *Radix astragali* is between 7.50 wt % to 12.50 wt %, the *Radix angelicae sinensis* is between 5.00 wt % to 8.34 wt %, the *Flos lonicerae* is between 6.25 wt % to 10.41 wt %, and the *Radix glycyrrhizae* is between 3.75 wt % to 6.25 wt %.

3. The composition of claim 2, wherein the *Fructus tsaoko* is 8.33 wt %, the *Rhizoma polygoni cuspidati* is 8.33 wt %, the *Radix scutellariae* is 6.67 wt %, the *Rhizoma anemarrhenae* is 6.67 wt %, the *Cortex magnoliae officinalis* is 6.67 wt %, the *Radix Paeoniae Alba* is 6.67 wt %, the *Rhizoma atractylodis* is 6.67 wt %, the *Herba agastaches/Pogostemonis* is 5.00 wt %, the *Semen armeniacae* is 6.67 wt %, the *Fructus trichosanthis* is 8.33 wt %, the *Radix Astragali* is 10.00 wt %, the *Radix angelicae sinensis* is between 6.67 wt %, the *Flos lonicerae* is 8.33 wt %, and the *Radix glycyrrhizae* is 5.00 wt %.

4. A method comprising the step of:
ingesting a composition comprising *Fructus tsaoko, Rhizoma polygoni cuspidati, Radix scutellariae, Rhizoma anemarrhenae, Cortex magnoliae officinalis, Radix paeoniae alba, Rhizoma atractylodis, Herba agastaches/Pogostemonis, Semen armeniacae, Fructus trichosanthis, Radix astragali, Radix angelicae sinensis, Flos lonicerae*, and *Radix Glycyrrhizae*, wherein the composition is integrated into a capsule, tablet, chewable tablet, pill, gum, lozenge, lollipop, hard candy, soft candy, syrup, drop, dissolvingsheet, dissolving powder, paste, or gel.

5. The method of claim 4, wherein the *Fructus tsaoko* is between 6.25 wt % to 10.41 wt %, the *Rhizoma polygoni cuspidati* is between 6.25 wt % to 10.41 wt %, the *Radix scutellariae* is between 5.00 wt % to 8.34 wt %, the *Rhizoma anemarrhenae* is between 5.00 wt % to 8.34 wt %, the *Cortex magnoliae officinalis* is between 5.00 wt % to 8.34 wt %, the *Radix paeoniae alba* is between 5.00 wt % to 8.34 wt %, the *Rhizoma atractylodis* is between 5.00 wt % to 8.34 wt %, the *Herba agastaches/Pogostemonis* is between 3.75 wt % to 6.25 wt %, the *Semen armeniacae* is between 5.00 wt % to 8.34 wt %, the *Fructus trichosanthis* is between 6.25 wt % to 10.41 wt %, the *Radix astragali* is between 7.50 wt % to 12.50 wt %, the *Radix angelicae sinensis* is between 5.00 wt % to 8.34 wt %, the *Flos lonicerae* is between 6.25 wt % to 10.41 wt %, and the *Radix glycyrrhizae* is between 3.75 wt % to 6.25 wt %.

6. The method of claim 5, wherein the *Fructus tsaoko* is 8.33 wt %, the *Rhizoma polygoni cuspidati* is 8.33 wt %, the *Radix scutellariae* is 6.67 wt %, the *Rhizoma anemarrhenae* is 6.67 wt %, the *Cortex magnoliae officinalis* is 6.67 wt %, the *Radix paeoniae alba* is 6.67 wt %, the *Rhizoma atractylodis* is 6.67 wt %, the *Herba agastaches!Pogostemonis* is 5.00 wt %, the *Semen armeniacae* is 6.67 wt %, the *Fructus trichosanthis* is 8.33 wt %, the *Radix astragali* is 10.00 wt %, the *Radix angelicae sinensis* is between 6.67 wt %, the *Flos lonicerae* is 8.33 wt %, and the *Radix glycyrrhizae* is 5.00 wt %.

7. The method of claim 4, further comprising the step of steeping the composition in water to create a tea, and the step of ingesting the tea.

8. A method of manufacturing a dietary supplement for health benefits comprising the steps of mixing shelf-stable forms of dried *Fructus tsaoko, Rhizoma polygoni cuspidati, Radix scutellariae, Rhizoma anemarrhenae, Cortex magnoliae officinalis, Radix paeoniae alba, Rhizoma atractylodis, Herba agastaches!Pogostemonis, Semen armeniacae, Fructus trichosanthis, Radix astragali, Radix angelicae sinensis, Flos lonicerae*, and *Radix glycyrrhizae* to homogeneity; and
preparing the dietary supplement such that individual doses of 4 g may be easily ingested.

9. The method of claim 8, wherein the *Fructus tsaoko* is between 6.25 wt % to 10.41 wt %, the *Rhizoma polygoni cuspidati* is between 6.25 wt % to 10.41 wt %, the *Radix scutellariae* is between 5.00 wt % to 8.34 wt %, the *Rhizoma anemarrhenae* is between 5.00 wt % to 8.34 wt %, the *Cortex magnoliae officinalis* is between 5.00 wt % to 8.34 wt %, the *Radix paeoniae alba* is between 5.00 wt % to 8.34 wt %, the *Rhizoma atractylodis* is between 5.00 wt % to 8.34 wt %, the *Herba agastaches/Pogostemonis* is between 3.75 wt % to 6.25 wt %, the *Semen armeniacae* is between 5.00 wt % to 8.34 wt %, the *Fructus trichosanthis* is between 6.25 wt % to 10.41 wt %, the *Radix astragali* is between 7.50 wt % to 12.50 wt %, the *Radix angelicae sinensis* is between 5.00 wt % to 8.34 wt %, the *Flos lonicerae* is between 6.25 wt % to 10.41 wt %, and the *Radix glycyrrhizae* is between 3.75 wt % to 6.25 wt %.

10. The method of claim 9, wherein the *Fructus tsaoko* is 8.33 wt %, the *Rhizoma polygoni cuspidati* is 8.33 wt %, the *Radix scutellariae* is 6.67 wt %, the *Rhizoma anemarrhenae* is 6.67 wt %, the *Cortex magnoliae officinalis* is 6.67 wt %, the *Radix Paeoniae Alba* is 6.67 wt %, the *Rhizoma atractylodis* is 6.67 wt %, the *Herba agastaches!Pogostemonis* is 5.00 wt %, the *Semen armeniacae* is 6.67 wt %, the *Fructus trichosanthis* is 8.33 wt %, the *Radix Astragali* is 10.00 wt %, the *Radix angelicae sinensis* is between 6.67 wt %, the *Flos lonicerae* is 8.33 wt %, and the *Radix glycyrrhizae* is 5.00 wt %.

\* \* \* \* \*